(12) United States Patent
Vij et al.

(10) Patent No.: US 11,727,015 B2
(45) Date of Patent: Aug. 15, 2023

(54) SYSTEMS AND METHODS FOR DYNAMICALLY MANAGING DATA SETS

(71) Applicant: ROYAL BANK OF CANADA, Toronto (CA)

(72) Inventors: Kanika Vij, Toronto (CA); Igor Reshynsky, Toronto (CA); Hameet Jassal, Toronto (CA); Emma Hu, Toronto (CA); Min Liang, Toronto (CA); Adam Lazure, Toronto (CA); Esther Choi, Toronto (CA); Rowan Comish, Toronto (CA); Jingyi Gao, Toronto (CA); Gladys Leung, Toronto (CA); Diane Fenton, Toronto (CA)

(*) Notice: Subject to any disclaimer, the term of this patent is extended or adjusted under 35 U.S.C. 154(b) by 0 days.

(21) Appl. No.: 17/127,637

(22) Filed: Dec. 18, 2020

(65) Prior Publication Data

US 2021/0191946 A1 Jun. 24, 2021

Related U.S. Application Data

(60) Provisional application No. 62/949,781, filed on Dec. 18, 2019.

(51) Int. Cl.
*G06F 16/00* (2019.01)
*G06F 16/2457* (2019.01)
*G06F 16/2455* (2019.01)
*G06F 16/248* (2019.01)

(52) U.S. Cl.
CPC ...... *G06F 16/24573* (2019.01); *G06F 16/248* (2019.01); *G06F 16/24568* (2019.01)

(58) Field of Classification Search
CPC ............ G06F 16/215; G06F 16/24568; G06F 16/24573; G06F 16/248
USPC .................................................. 707/600–899
See application file for complete search history.

(56) References Cited

U.S. PATENT DOCUMENTS

| | | | |
|---|---|---|---|
| 11,182,691 B1* | 11/2021 | Zhang | G06N 20/20 |
| 11,216,742 B2* | 1/2022 | Bhattacharyya | G06N 7/005 |
| 11,442,941 B2* | 9/2022 | Chamarajnagar | G06F 11/0751 |
| 2016/0078361 A1* | 3/2016 | Brueckner | H04L 67/10 |
| | | | 706/12 |
| 2020/0053108 A1* | 2/2020 | Cili | H04L 63/1441 |
| 2020/0134061 A1* | 4/2020 | Gaber | G06N 7/005 |

(Continued)

*Primary Examiner* — Michelle N Owyang
(74) *Attorney, Agent, or Firm* — Norton Rose Fulbright Canada LLP

(57) ABSTRACT

Systems and methods of monitoring for anomalous data records. The system conducts a method including: receiving a data record associated with at least one meta attribute to determine whether subsequent processing of the data record is warranted; generating an anomaly prediction for the data record based on a detection model and the at least one meta attribute associated with the data record, the detection model defined by a plurality of score distribution representations based on quantile bins and a dynamic quantile weight for providing an interim anomaly measure corresponding to respective score distribution representations, wherein the anomaly prediction is generated based on a combination of interim anomaly measures associated with respective meta attributes associated with the data record; and transmitting a signal representing the anomaly prediction for presentation at a user device for identifying one or more data records for subsequent data processes.

20 Claims, 10 Drawing Sheets

(56) References Cited

U.S. PATENT DOCUMENTS

2020/0201727 A1* 6/2020 Nie ................. G06N 20/00
2020/0311603 A1* 10/2020 Qiu ................. G06N 5/04

* cited by examiner ns AND METHODS FOR
DYNAMICALLY MANAGING DATA SETS

CROSS REFERENCE TO RELATED APPLICATIONS

This application claims priority from U.S. provisional patent application No. 62/949,781, entitled "SYSTEMS AND METHODS FOR DYNAMICALLY MANAGING DATA SETS", filed on Dec. 18, 2019, the entire contents of which are hereby incorporated by reference herein.

FIELD

Embodiments of the present disclosure generally relate to monitoring data records, and in particular to systems and methods of monitoring for anomalous data records in a plurality of data records.

BACKGROUND

Data management servers may be configured to receive volumes of datasets from a plurality of data sources and may conduct operations for monitoring data records of the datasets. Operations for monitoring data records may be based on one or a plurality of criteria.

SUMMARY

In one aspect, the present disclosure provides a system of monitoring for anomalous data records in a plurality of data records. The system includes a processor and a memory coupled to the processor. The memory may store processor-executable instructions that, when executed, may configure the processor to: receive a data record associated with at least one meta attribute to determine whether subsequent processing of the data record is warranted; generate an anomaly prediction for the data record based on a detection model and the at least one meta attribute associated with the data record, the detection model defined by a plurality of score distribution representations based on quantile bins and a dynamic quantile weight for providing an interim anomaly measure corresponding to respective score distribution representations, wherein the anomaly prediction is generated based on a combination of interim anomaly measures associated with respective meta attributes associated with the data record; and transmit a signal representing the anomaly prediction for presentation at a user device for identifying one or more data records for subsequent data processes.

In another aspect, the present disclosure provides a method of monitoring for anomalous data records in a plurality of data records. The method may include: receiving a data record associated with at least one meta attribute to determine whether subsequent processing of the data record is warranted; generating an anomaly prediction for the data record based on a detection model and the at least one meta attribute associated with the data record, the detection model defined by a plurality of score distribution representations based on quantile bins and a dynamic quantile weight for providing an interim anomaly measure corresponding to respective score distribution representations, wherein the anomaly prediction is generated based on a combination of interim anomaly measures associated with respective meta attributes associated with the data record; and transmitting a signal representing the anomaly prediction for presentation at a user device for identifying one or more data records for subsequent data processes.

In another aspect, a non-transitory computer-readable medium or media having stored thereon machine interpretable instructions which, when executed by a processor may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Embodiments of systems and methods of monitoring for anomalous data records based on detection models are described present disclosure. In some embodiments, datasets may include a plurality of data records. In some examples, data records may include journal entries recording resource transfers. A resource transfer may be associated with a transfer of monetary funds, digital assets, tokens, precious materials, or other types of resources. Other types of datasets and data records having data structures for capturing other types of data may be contemplated.

In some scenarios, a data record may include data values associated with a resource transfer (e.g., monetary transaction between a sender device and a receiver device). The data record may include data values associated with a user identifier, an organizational title or position of a user (e.g., department vice president, manager, employee, etc.), date of resource transfer, or textual description of the resource transfer, among other examples. As the data record may be based on a user inputting data values via a client device, for ease of exposition, data records may be described as "manual journal entries".

To illustrate features of embodiments disclosed herein, manual journal entries may be for tracking resource transfers at a banking institution. Systems may retrieve or receive data records from systems storing general ledgers, human resources data, data for foreign exchange transactions, or other systems storing data associated with transactions. Prior to finalizing a resource transfer between the sender device and the receiver device, in some scenarios, an approver user may review manual journal entries via a client device and, if approved, the client device may receive an approval signal from the approver user (e.g., clicking a user interface button), such that the manual journal entries may be promoted or otherwise advanced to a subsequent resource transfer stage.

In some scenarios, such approval or promotion operations of manual journal entries may be discretionary or may be based on operations that may not ensure an appropriate level of data record scrutiny prior to approval. It may be beneficial to provide systems and methods of monitoring for anomalous data records, thereby increasing the chance or confidence that approval or promotion of manual journal entries adhere to policies associated with data record accuracy, data record completeness, or data record adherence to organizational policies. For example, it may be beneficial to provide systems and methods for identifying outlier data records based on detection models generated by datasets from a prior points in time.

Figure 1:
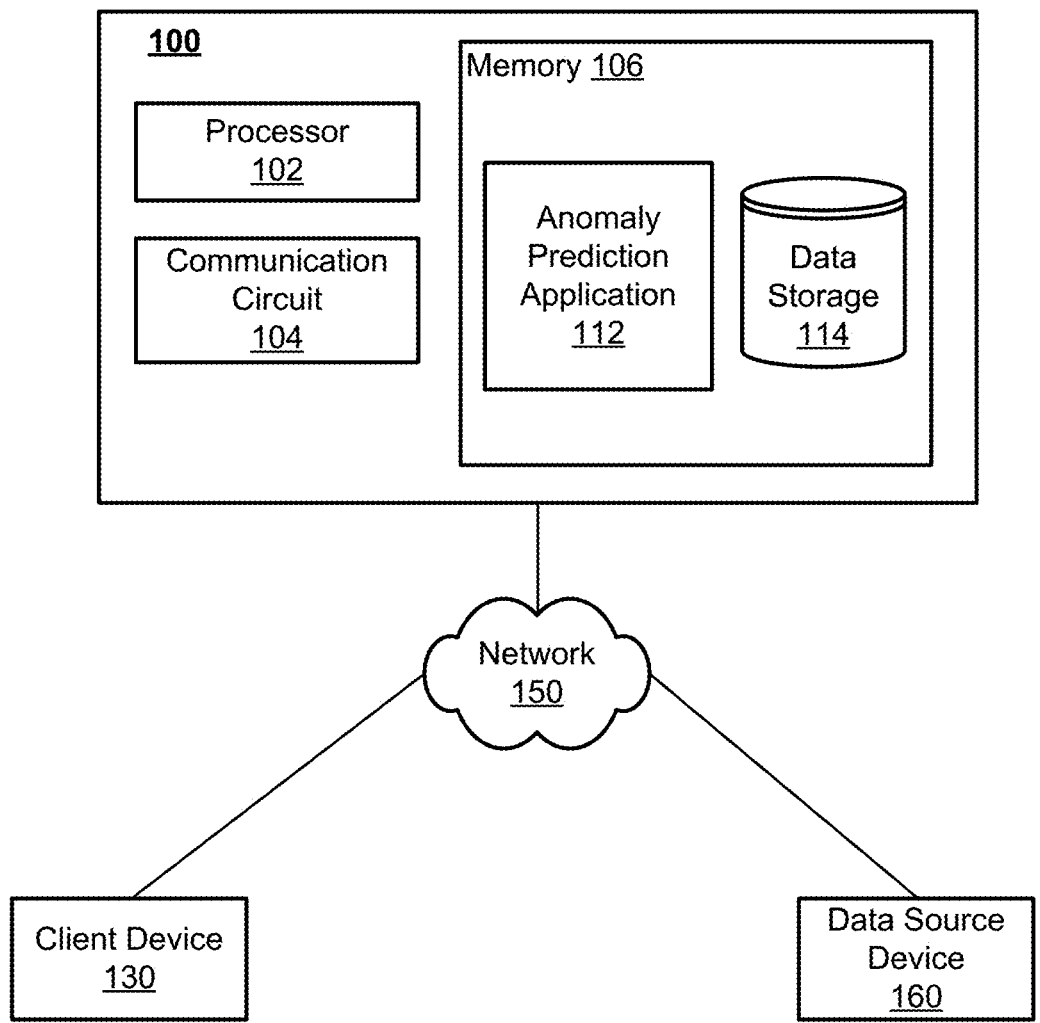
FIG. 1 illustrates a system, in accordance with an embodiment of the present disclosure.

Reference is made to FIG. 1, which illustrates a system 100, in accordance with an embodiment of the present disclosure. The system 100 may transmit or receive data messages via a network 150 to/from a client device 130 or one or more data source devices 160. While one client device 130 and one data source device 160 is illustrated in FIG. 1, it may be understood that any number of client devices or data source devices may transmit or receive data messages to or from the system 100.

The network 150 may include a wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated.

The system 100 includes a processor 102 configured to implement processor-readable instructions that, when executed, configure the processor 102 to conduct operations described herein. For example, the system 100 may be configured to conduct operations for receiving volumes of datasets from one or more data source devices and generating outlier or anomaly detection models based on the volumes of datasets. The volumes of datasets may include data records such as journal entries associated with resource transfers. Examples of resources may include monetary funds, digital assets, tokens, precious metals, or other types of resources.

In some embodiments, the generated anomaly detection models may be based on trends, statistical measures, or other status quo metrics associated with datasets from prior points in time. In some embodiments, the generated anomaly detection models may be associated with identifying institutional abnormalities, such as potentially un-scrutinized, erroneous, inaccurate, or fraudulent resource transfers. In some embodiments, the generated anomaly detection models may be associated with identifying data records that were approved or otherwise promoted but that may be determined to not have been sufficiently scrutinized. Further examples will be described herein.

In some embodiments, the processor 102 may be a microprocessor or microcontroller, a digital signal processing processor, an integrated circuit, a field programmable gate array, a reconfigurable processor, or combinations thereof.

The system 100 includes a communication circuit 104 configured to transmit or receive data messages to or from other computing devices, to access or connect to network resources, or to perform other computing applications by connecting to a network (or multiple networks) capable of carrying data.

In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks. In some examples, the communication circuit 104 may include one or more busses, interconnects, wires, circuits, or other types of communication circuits. The communication circuit 104 may provide an interface for communicating data between components of a single device or circuit.

The system 100 includes memory 106. The memory 106 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 106 may be storage media, such as hard disk drives, solid state drives, optical drives, or other types of memory.

The memory 106 may store an anomaly prediction application 112 including processor-executable instructions that, when executed, configure the processor 102 to conduct operations disclosed in the present disclosure. In some embodiments, the anomaly prediction application 112 may include operations for generating one or more anomaly prediction models based on received volumes of datasets.

In some embodiments, datasets or data records may be configured as data matrices, data formatted as comma separated values, or other data structures. Respective data records may include at least one data value associated with a data type. To illustrate, an example dataset may include a data matrix illustrated in Table 1 (below).

TABLE 1

Example Data Set

| JOURNAL ID | Approval Date/Time | Create Date/Time | Approver ID | Resource Amount | Type | JOURNAL DESCRIPTION |
|---|---|---|---|---|---|---|
| 7330487 | 2018 Jul. 29 23:49:16-04:00 | 2018 Jul. 29 23:46:45-04:00 | 313725020 | 10 | CAD | PTB WRITE OFF BELOW $50.00 |
| 7330487 | 2018 Jul. 29 23:49:16-04:00 | 2018 Jul. 29 23:46:45-04:00 | 313725020 | −40 | CAD | PTB WRITE OFF BELOW $50.00 |
| 7330487 | 2018 Jul. 29 23:49:16-04:00 | 2018 Jul. 29 23:46:45-04:00 | 313725020 | 0.75 | CAD | PTB WRITE OFF BELOW $50.00 |
| 7004955 | 2017 Nov. 4 21:05:00+08:00 | 2017 Nov. 4 20:56:35+08:00 | 543214225 | −245335.0074 | SGD | IG CORRECTION-OCT 2017 |
| 7004955 | 2017 Nov. 4 21:05:00+08:00 | 2017 Nov. 4 20:56:35+08:00 | 543214225 | 96493.29678 | USD | IG CORRECTION-OCT 2017 |

The dataset may include a plurality of data records (e.g., respective rows) and may include a plurality of data types (e.g., respective columns). The data types may include data such as journal entry identification numbers, journal entry creation date/time, journal entry approval date/time, journal entry approver identification number, a resource transfer amount, a currency type, a journal entry description, or other data types. The dataset in Table 1 is a simplified example for illustration only, and the dataset may include any number of data entries or data records and may include any number of data types.

In some embodiments, the anomaly prediction application 112 may include operations for generating one or more meta attributes associated with respective data records. Meta attributes associated with respective data records may be descriptive or representative of characteristics associated with respective data records individually or respective data records relative to other records in a dataset.

For example, the anomaly prediction application 112 may include operations for identifying a subset of data records that were approved by a particular approver user (e.g., a department vice president having a particular "Approver ID"), and determining the rate at which the particular approver user approved a series of data records associated with resource transfers. In some scenarios, the anomaly prediction application 112 may include operations to identify one or more data records as being outliers or anomalous on the basis that the data records may not have been sufficiently scrutinized if the particular approver user approved data records in a short duration of time.

Examples of meta attributes associated with data record characteristics are illustrated in Table 2 (below).

TABLE 2

Example Data Entry Characteristics

| Meta Attribute | Description of Attribute | Score Type |
|---|---|---|
| Journal_approval_rate | The rate at which a series of journal entries were approved. Divides the number of lines in a journal by Approve_Create_Time_Diff | Continuous |
| Approver_Reverse_Jp | Percentage of journals associated with an approver that are auto-reversals, such as journal entries corrected after journal entry creation. | Continuous |
| Transit_median_amount | Median absolute CAD amount for a particular organizational group combination | Continuous |
| Approve_Create_Time_Diff | time difference between approval time and creation time | Continuous |
| Journal_Create_IsWorkDay | journal is created on a work day? | boolean |
| Journal_Create_IsWorkHour | journal is created in work hours? (8 AM-7 PM) | boolean |
| Journal_Approve_IsWorkDay | journal is approved on a work day? | boolean |
| Journal_Approve_IsWorkHour | journal is approved in work hours? (8 AM-7 PM) | boolean |
| Journal_isReverse | journal is a reversed one? | boolean |
| Journal_has_NoDescr | Indicates whether a journal entry may be missing a description | boolean |
| Journal_hasFlagWord | journal has flag words?, where flag words may include "clean", "clear", "fix", "per", "indicated", "request", "error", "correct", "fraud", "none", "N/A", "NA", "delete", "unusual", "mistake", "incorrect", "urgent", "approve", "review", "write off", "writeoff" | boolean |
| Journal_isWriteOff | journal is writing-off? | boolean |
| Num_Line | number of lines in a journal | Continuous |
| CAD_AMOUNT | the Canadian dollar amount in a line; where higher dollar value may be associated with relatively higher risk | Continuous |

TABLE 2-continued

Example Data Entry Characteristics

| Meta Attribute | Description of Attribute | Score Type |
| --- | --- | --- |
| Type | the type of account; where particular types of data entries or accounts may be flagged as being suspicious | boolean |
| Status | the status of account (noisy); where a closed account may be flagged as such, removing such an account from scrutiny | boolean |
| IG | is the account an intragroup one?; where an intra-group account may be identified as such | boolean |
| Account_AVE_AMOUNT | the average amount flowed in the account in this year; where a higher dollar value may be associated with relatively higher risk | Continuous |
| Account_MAX_AMOUNT | the maximum amount flowed in the account in this year; where a higher dollar value may be associated with relatively higher risk | Continuous |
| PP_SAME_Plf | approver and creator are in the roll up unit? | boolean |
| APR_SAME_Plf | approver belongs to the same roll up unit of the journal line? | boolean |
| CRT_SAME_Plf | creator belongs to the same roll up unit of the journal line? | boolean |
| APR_Status | status of the approver (noisy) | boolean |
| CRT_Status | status of the creator (noisy) | boolean |
| MisCreator | cannot find creator HR information? (noisy) | boolean |
| MisApprover | cannot find approver HR information? (noisy) | boolean |
| Approver_Days | how many days the approver works on the manual journal entry (MJE); where the score may indicate entry approvers having worked relatively few or relatively large number of days | Continuous |
| Creator_Days | how many days the creator works on MJE; where the score may indicate entry approvers having worked relatively few or relatively large number of days | Continuous |
| Creator_higherSenior | creator level higher than PL07? | boolean |
| Approver_higherSenior | approver level higher than PL07? | boolean |
| Creator_higherThan_Approver | creator level than approver level? | boolean |
| Approver_isWorkHour_Jp | percentage of journals approved outside work hours by this approver; where entry approvers working outside of normal business hours may be associated with greater risk of error | Continuous |
| Approver_isWorkDay_Jp | percentage of journals approved outside work days by this approver | Continuous |
| Approver_Reverse_Jp | percentage of reversed journals approved by this approver | Continuous |
| Approver_FlagWords_Jp | percentage of journals containing flag words approved out of work hour by this approver | Continuous |
| Approver_WriteOff_Jp | percentage of write-off journals approved out of work hour by this approver | Continuous |
| Approver_AVE_AMOUNT | average dollar amount approved in this year; where a higher dollar value may be associated with relatively higher risk | Continuous |
| Approver_MAX_AMOUNT | maximum dollar amount approved in this year; where a higher dollar value may be associated with relatively higher risk | Continuous |
| Creator_isWorkHour_Jp | percentage of journals created outside work hours by this creator | Continuous |
| Creator_isWorkDay_Jp | percentage of journals created outside work days by this creator | Continuous |
| Creator_Reverse_Jp | percentage of reversed journals created by this creator | Continuous |
| Creator_FlagWords_Jp | percentage of journals containing flag words created out of work hour by this creator | Continuous |
| Creator_WriteOff_Jp | percentage of write-off journals created out of work hour by this creator | Continuous |
| Creator_AVE_AMOUNT | average dollar amount created in this year; where a higher dollar value may be associated with relatively higher risk | Continuous |
| Creator_MAX_AMOUNT | maximum dollar amount created in this year; where a higher dollar value may be associated with relatively higher risk | Continuous |
| EXE_AVE_AMOUNT | percentage of amounts that exceed the average amounts for that GL account, how close this transaction is to the account's average | Continuous |
| COV_MAX_AMOUNT | percentage of amounts that cover the maximum amounts for that GL account, how close this transaction is to the account's maximum | Continuous |

In some embodiments, the anomaly prediction application 112 may include operations of monitoring for anomalous data records in a plurality of data records, and of identifying potentially outlier or anomalous data records, thereby indicating that subsequent data process operations may be warranted. For example, where a data record may be flagged as being potentially an outlier or anomalous, the system 100 may be configured to conduct subsequent data process operations for further scrutinizing the data record prior to proceeding with approval or promotion processes.

The system 100 includes data storage 114. In some embodiments, the data storage 114 may be a secure data store. In some embodiments, the data storage 114 may store one or more data records received from the data source device 160. For example, the data storage 114 may store a plurality of data records representing manual journal entries associated with the past 3 months.

In some embodiments, the data storage 114 may store one or more meta attributes or metrics/scores associated with the respective meta attributes of the plurality of data records. In some examples, the metrics/scores associated with meta attributes may be binary scores, thereby having a value of 0 (e.g., indicating low chance of being an outlier/anomaly) or having a value of 1 (e.g., indicating a higher chance of being an outlier/anomaly). In some examples, the metrics/scores associated with meta attributes may be continuous scores, thereby having values that may range between 0 and 1. With continuous scores, values nearer to a value of 1 may be associated with higher chance of being an outlier/anomaly).

In some embodiments, metrics/scores associated with meta attributes of data records may be configured as anomalous ascending metrics, such that when the system 100 determines that the metric or score increases in value, the chance of that data record being an outlier or anomalous data record increases relative to a subset or population of related data records.

In some embodiments, metrics/scores associated with meta attributes of data records may be continuous scores, whereby the metrics/scores may have values ranging between 0 and 1. Metrics/scores that approach a value of 1 may indicate that the data record has an increased likelihood of being an anomalous data record.

As will be described with reference to some embodiments in the present disclosure, the system 100 may conduct operations to monitor one or more data records for identifying outlier or anomalous data records that may warrant subsequent data processes thereon. The monitoring of data records may be based on detection models defined, at least in part, by a plurality of score distribution representations generated based on datasets.

The client device 130 may be a computing device, such as a mobile smartphone device, a tablet device, a personal computer device, or a thin-client device. The client device 130 may be configured to transmit messages to/from the system 100 for querying data records associated with one or more meta attributes. As will be disclosed in examples of the present disclosure, the one or more meta attributes may be associated with characteristics of the particular data record individually or of the particular data record relative to other data records in a plurality of data records.

The client device 130 may include a processor, a memory, or a communication circuit, similar to the example processor, memory, or communication circuit of the system 100. In some embodiments, the client device 130 may be a computing device associated with a local area network. The client device 130 may be connected to the local area network and may transmit one or more data sets or signals to the system 100.

The data source device 160 may be a computing device, such as data servers, database devices, or other data storing systems associated with resource transaction entities. Continuing with examples disclosed herein, the data source device 160 may be associated with a banking institution. The data source device 160 may include one or more of a general ledger, journal entry systems, human resource data systems, finance data servers for foreign exchange rates, or the like. Journal entries may be data records for capturing resource transfers between accounts or parties.

In some examples, journal entries may represent transfer of monetary resources from one account to another account. In some examples, journal entries may represent an expense report allowing an employee user to seek reimbursement from an employer user for expenses that were incurred by the employee on behalf of the employer. In some examples, journal entries may represent transfer of property from one user to another user. In some scenarios, prior to completing resource transfers contemplated by journal entries, such journal entries may be subject to scrutiny or approval by an approver user. An approver user may be associated with a client device 130, and may review journal entries identified as requiring scrutiny by that approver user. Once the approver user agrees that the journal entry is acceptable, the client device 130 may receive an indication (e.g., via a user interface) that the journal entry is acceptable, and transmit the approval indicator to the system 100. The journal entry may then be finalized.

Because journal entry approvals may include discretionary input from an approver user, it may be beneficial to provide systems and methods of monitoring for anomalous data records for identifying data records that may be deemed to be outliers based on datasets associated with prior points in time. Examples of outlier data records may include series of data records identified to have been deemed to be acceptable by a given approver user in a short period of time (e.g., 500 journal entries identified via a client device by an approver user as being acceptable within the span of 5 minutes). In another example, outlier data records may include data records having journal description text having particular words or terms, such as fraud, error, write-off, among other examples. In another example, outlier data records may include data records recording a resource value that may differ from a median (or other quantitative measure) amount for a particular group of data records (e.g., data records of a particular department at the banking institution).

In some embodiments, the system 100 may conduct operations to generate anomaly detection models for generating predictions on whether respective data records may warrant subsequent data processing. For example, the anomaly detection models may be configured to identify data records that may be outlier data records relative to data records in a population. When outlier data records may be identified, the system 100 may be configured to conduct operations for determining whether the identified data record adhere to defined criteria.

As disclosed herein, in some embodiments, the system 100 may generate one or more meta attributes associated with data records. For example, meta attributes may be scores or metrics that are descriptive or representative of characteristics associated with respective data records: (a) individually; or (b) relative to a plurality of data records in a dataset.

In some embodiments, the system 100 may generate one or more models associated with distributions of respective meta attributes for a plurality of data records in a dataset. To illustrate examples, reference will be made to FIGS. 2A, 2B, 3A, 3B, 4A, and 4B.

Figure 2A:
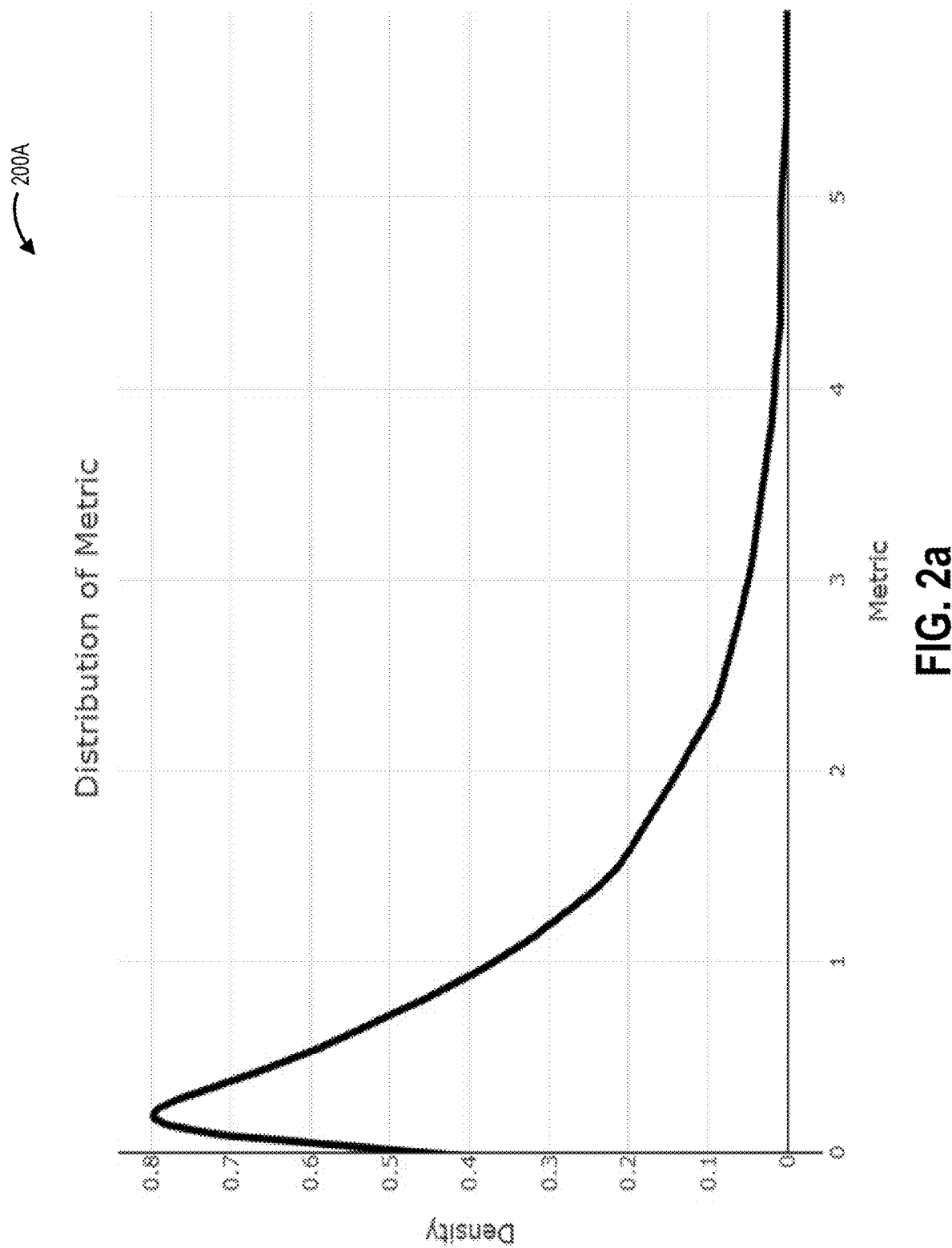
FIGS. 2A and 2B illustrate metric distribution representations, in accordance with embodiments of the present disclosure.

FIG. 2A illustrates a graphical plot 200A associated a data attribute corresponding to a plurality of data records. As a non-limiting example, the data attribute may be associated with values that may range from 0 to 6. In FIG. 2A, the graphical plot 200A may illustrate a proportion (or density) of data records having a metric value along the range of metric values. In some embodiments, the system 100 may generate one or more models based on the metric distribution representation illustrated in FIG. 2A, such that outlier or anomalous data records may exhibit data attributes having a metric described as "right skew", or on the "right" side of the metric distribution representation.

Figure 2B:
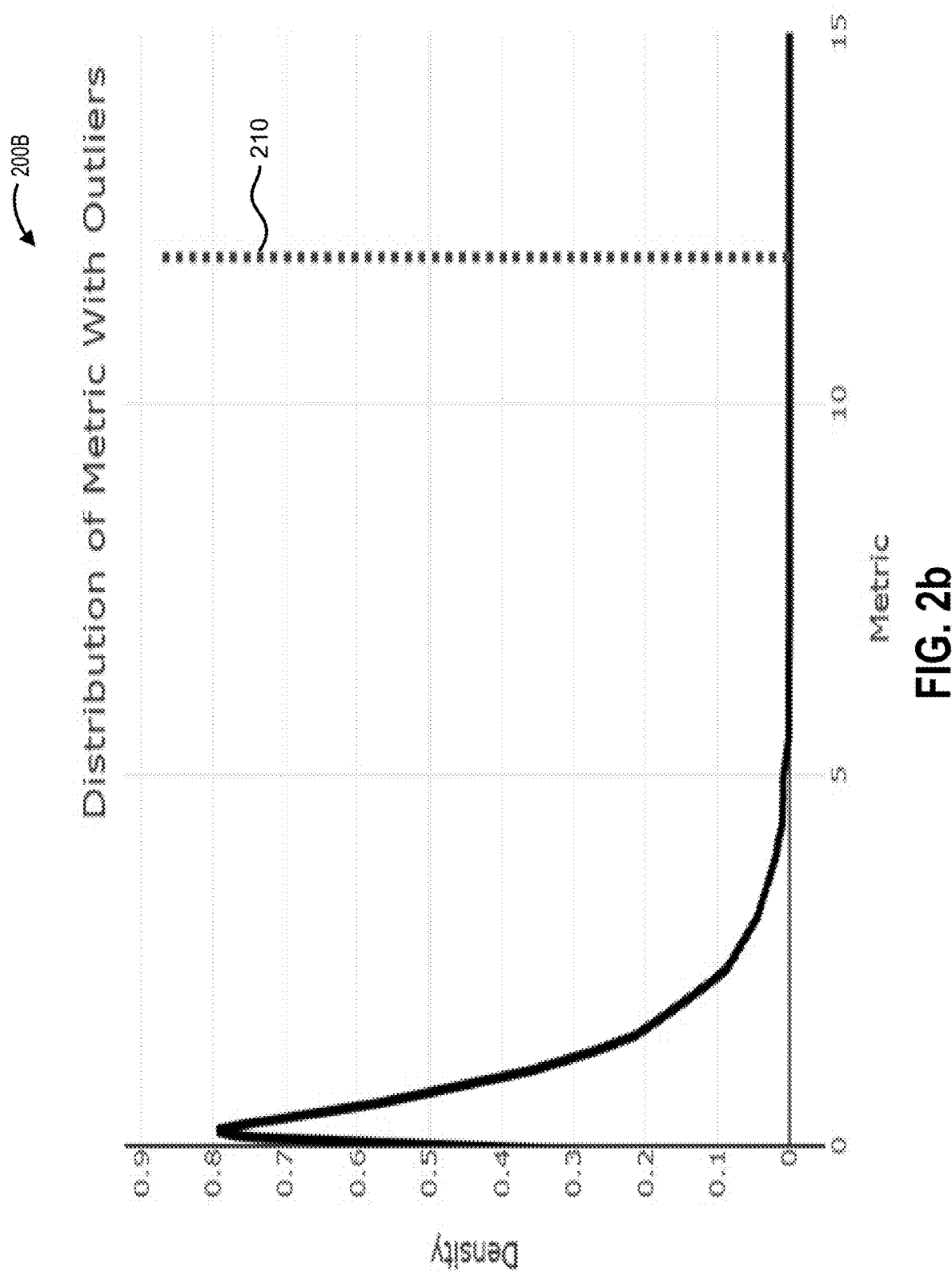

FIG. 2B illustrates a graphical plot 200B of a metric distribution representation with a greater number of identified outlier or anomalous data records. In FIG. 2B, a median value of the plurality of identified anomalous data records is illustrated by a graphical indicator 210.

To transform the metric distribution representation to a score, the system 100 (FIG. 1) may be configured to transform the distribution representation to a predefined scale based on normalizing operations. In some embodiments, operations for minimum-maximum scaling may be conducted based on the following relationship:

$$\text{min\_max\_metric} = (\text{metric} - \min(\text{metric}))/(\max(\text{metric}) - \min(\text{metric}))$$

The above operations of minimum-maximum scaling may bias the metric distribution to a scale between values of 0 and 1.

Figure 3A:
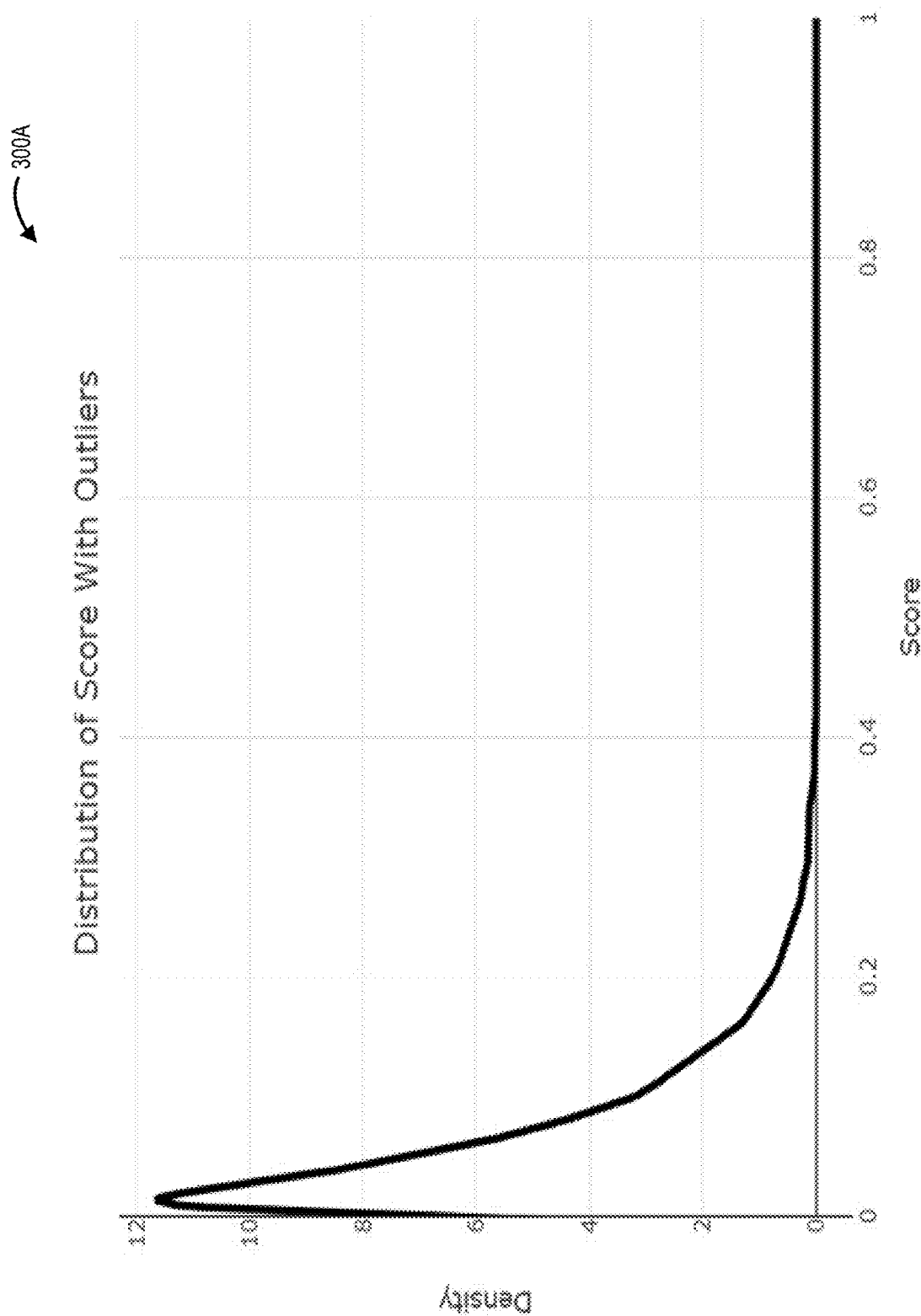
FIGS. 3A and 3B illustrate score distribution representations, in accordance with embodiments of the present disclosure.

To illustrate, reference is made to FIG. 3A, which illustrates a score distribution representation 300A corresponding to a meta attribute for a plurality of data records. In FIG. 3A, the score distribution representation 300A illustrates a density plot of meta attribute scores from values 0 to 1. However, in the score distribution representation 300A, meta attribute scores associated with outlier data records may cause a maximum value for the minimum-maximum scaling calculation to dominate other meta attribute scores.

Figure 3B:
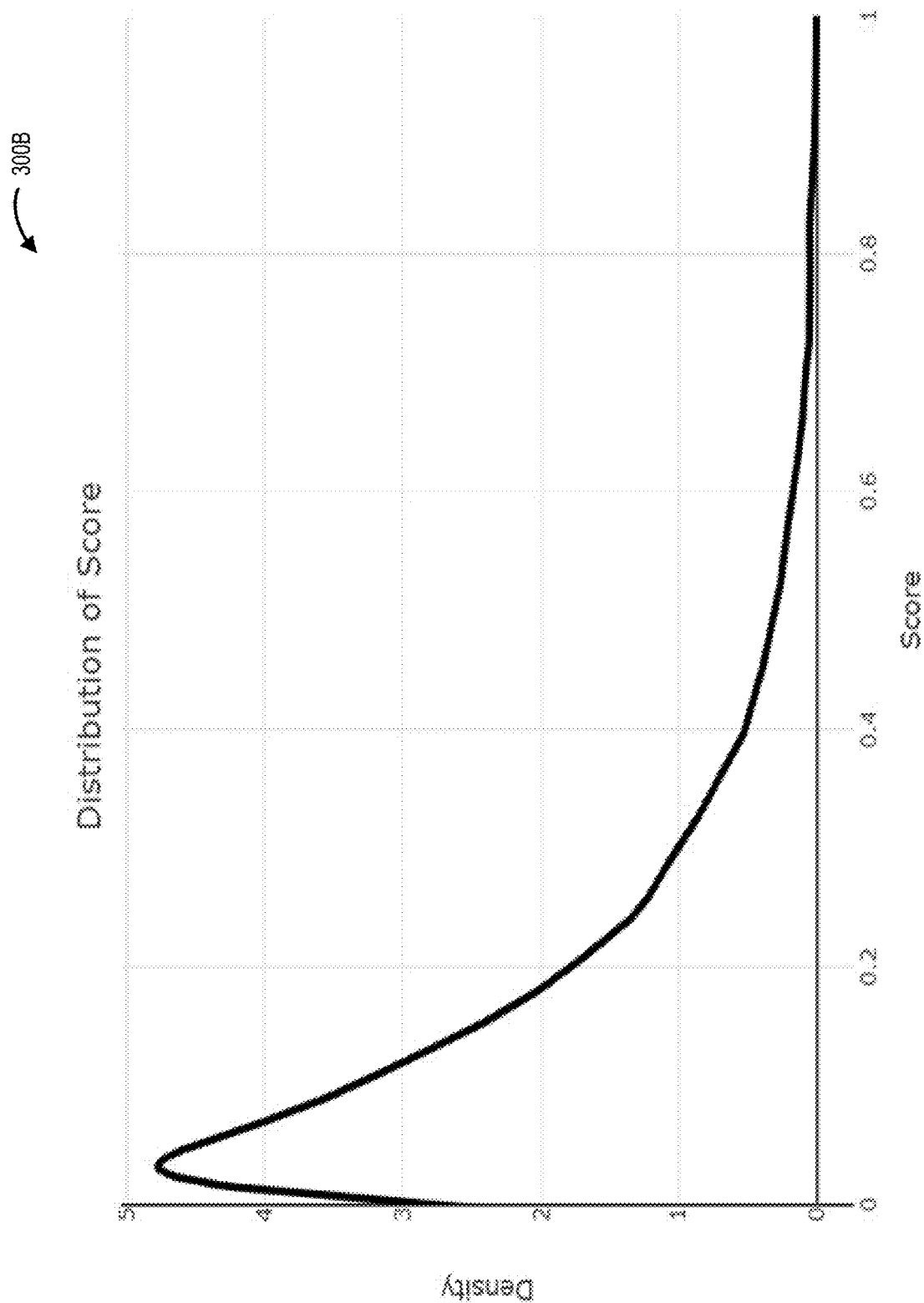

To illustrate the dominating impact to the score distribution representation 300A, reference is made to FIG. 3B, which illustrates a score distribution representation 300B having meta attribute scores associated with outlier data records omitted. However, an anomaly detection model based on the score distribution representation 300B of FIG. 3B may not correspond to an accurate model for identifying anomalous data records.

In some embodiments, the system 100 may conduct operations for applying a log transformation based on the relationship:

$$\text{log\_metric} = \log(\text{metric} + 1)$$

thereby minimizing impact of meta attribute scores associated with outlier data records. To illustrate, reference is made to FIG. 4A, which illustrates a metric distribution representation 400A based on the example logarithmic transformation disclosed above. The metric distribution representation 400A may be a plot of meta attribute metric values associated with a plurality of data records, including outlier data records.

Figure 4A:
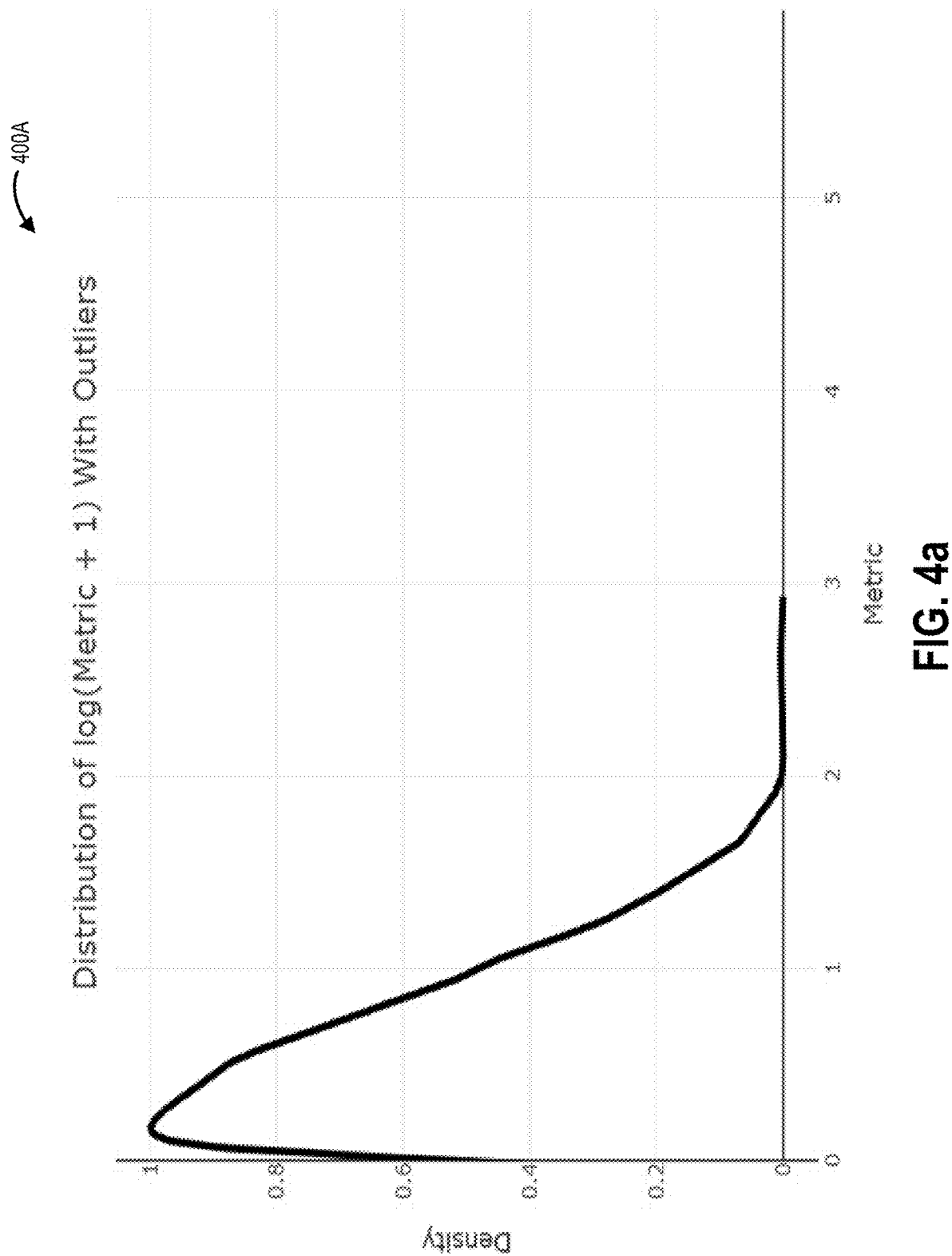
FIGS. 4A and 4B illustrate a logarithmic transformed metric distribution representation and a score distribution representation, respectively, in accordance with embodiments of the present disclosure.
Figure 4B:
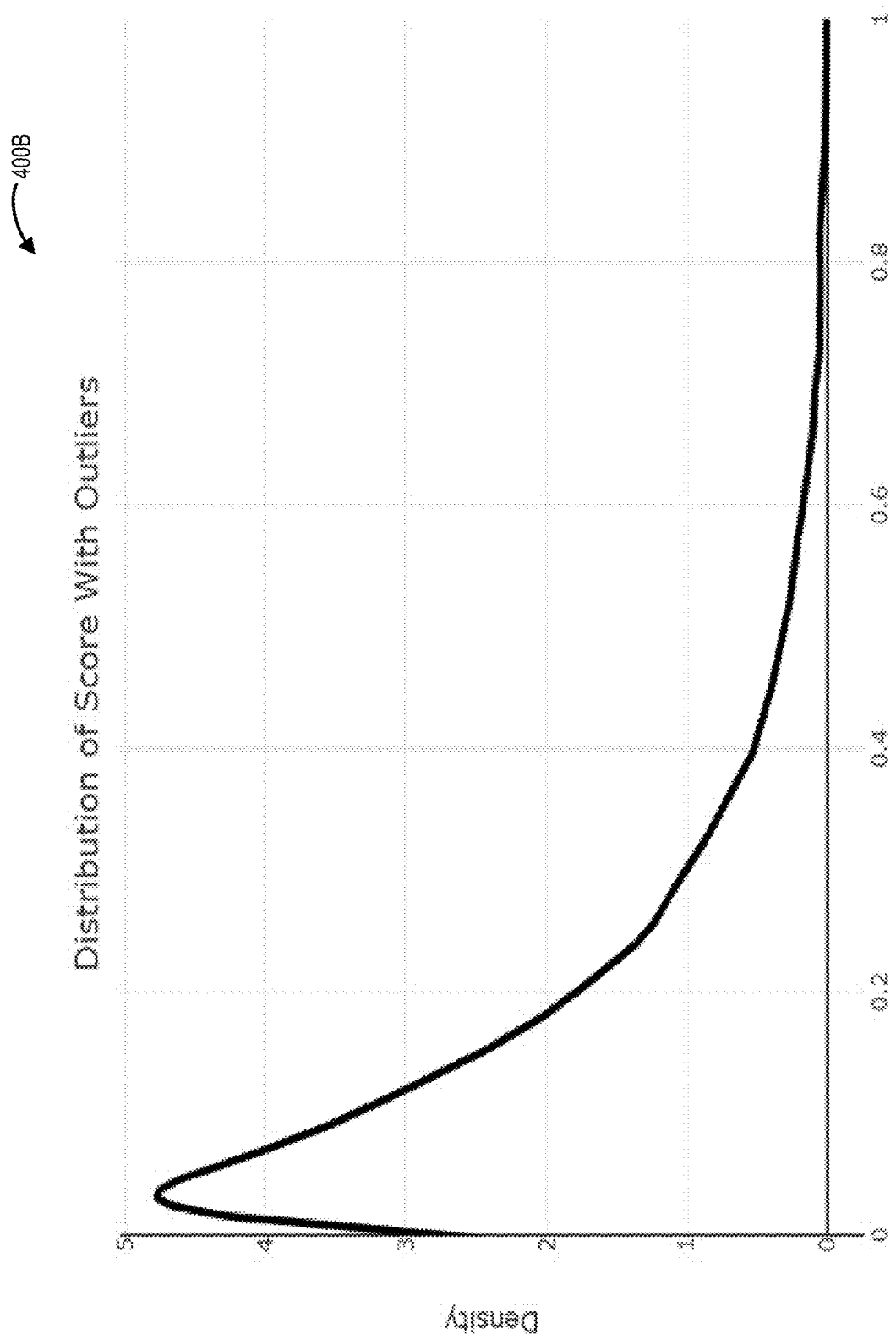

FIG. 4B illustrates a score distribution representation 400B based on the metric distribution representation 400A illustrated in FIG. 4A. The system 100 may conduct operations to generate the score distribution representation 400B based on a minimum-maximum scaling normalization operation. In some embodiments, the normalization operation may be based on the following relationship:

$$\text{min\_max\_metric} = (\text{metric} - \min(\text{metric}))/(\max(\text{metric}) - \min(\text{metric}))$$

In the example illustrated in FIG. 4B, the score distribution representation 400B may be based on meta attribute values associated with outlier data records without having a dominating impact on the score distribution representation.

Data records that may be identified as being extreme outliers (e.g., having a meta attribute metric or score that deviates greatly from a central tendency of other meta attribute metric or score) may have a dominating effect on the distribution representations when the data records identified as being extreme outliers may make the scores of other data records less relevant. In some scenarios, without applying the example logarithmic transformation to distribution representations having at least one data record identified as being an extreme outlier, the distribution representation may not be representative of a required anomaly prediction model. That is, without the example logarithmic transformation, data records that may be non-extreme outliers may not be identified as such at least because data records corresponding to extreme outliers may skew the detection model to minimize identification of the non-extreme outliers.

In some embodiments, meta attributes associated with data records may take on a value that may be between a negative value and a positive value. In such scenarios, a logarithmic transformation for minimizing impact of meta attribute scores associated with outlier data records may be defined by the following relationship:

$$\text{log\_metric} = \log(\text{metric} + \text{abs}(\min(\text{metric})) + 1)$$

Figure 5:
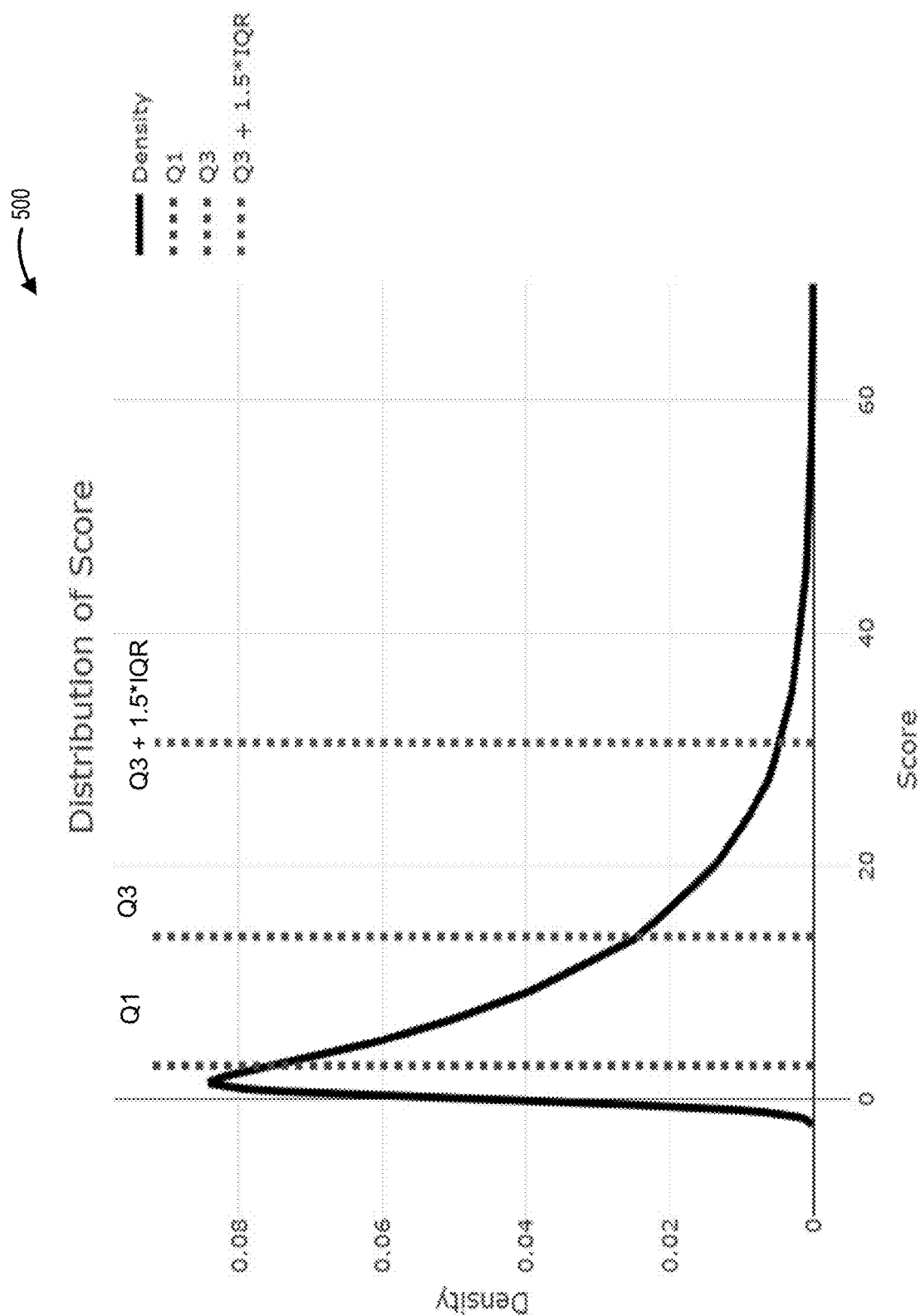
FIG. 5 illustrates a score distribution representation, in accordance with another embodiment of the present disclosure.

Reference is made to FIG. 5, which illustrates a score distribution representation 500, in accordance with another embodiment of the present application. In some embodiments, the system 100 (FIG. 1) may conduct operations to generate an anomaly detection model based on the score distribution representation 500.

For example, the score distribution representation 500 may correspond to a distribution of normalized meta attribute metric values associated with a plurality of data records. The density associated with quantity of data records having respective meta attribute scores may be considered for generating the anomaly detection model to define outlier or anomaly categories.

In some embodiments, an anomaly prediction application 112 (FIG. 1) of FIG. 1 may include operations to identify quantile reference points associated with the score distribution representation 500. For instance, quantiles may be a set of values of a variate which may divide the score distribution representation 500 into groups, each group including a fraction of a dataset.

As an illustrating example, if a 25th percent quantile is estimated, the system 100 may expect that 25% of score values would be lesser than this value, and that 75% of score values would be greater than this value.

In another example, a quartile may be a quantile that divides associated meta attribute scores into quarters. For example, 25th, 50th, 75th percent quantiles may be referred to as the first (Q1), second (Q2), and third quartiles (Q3), respectively.

In some embodiments, the system 100 may generate an anomaly detection model based on an inter-quartile range (IQR) defined as Q3−Q1. The system 100 may determine that an upper anomaly category be defined by an outlier threshold defined by Q3+C*IQR, where C is a threshold factor.

In FIG. 5, the upper anomaly category may be based on a threshold factor (C) having a value of 1.5, and the upper anomaly category may be provided by: Q3+1.5*IQR.

In FIG. 5, the quantile thresholds Q1, Q3, and Q3+1.5*IQR may be associated with the score distribution representation 500 to provide an anomaly detection model for determining whether subsequent processing of a given data record associated with a meta attribute may be warranted. For example, a data record having a meta attribute score that is greater than the upper anomaly category threshold may be considered "high" anomaly. That data record may be identified by the system 100 for subsequent processing, such that the data record may be further scrutinized for adherence to defined criteria.

In some embodiments, the system 100 may determine one or more threshold factors (C) based on a plurality of datasets associated with prior points in time. In some embodiments, the threshold factor (C) may be a dynamically tunable parameter, and the system 100 may conduct operations for determining a threshold factor (C) for a given score representation distribution, thereby setting one or more boundaries for identifying a desired quantity of outlier data records. For example, the threshold factor (C) may be dynamically altered based on the time of year (e.g., year-end requirement to identify outliers having particular meta attributes) or based on capacity to conduct further data operation processes (e.g., increase in cloud computing resources, thereby the system being able to handle more audits of data record outliers). Other example scenarios that may lead to dynamically tuning the threshold parameter may be contemplated.

Quantile reference points are described herein as an illustrating example; however, it may be contemplated that the anomaly prediction application 112 may include other operations to identify threshold reference points associated with the score distribution representation 500 based on non-parametric, unsupervised outlier detection. That is, operations for determining reference points for modelling outlier threshold categories for score distribution representations may not depend on data distributions or may not depend on labelled data.

Data records may be associated with one or more meta attributes for identifying characteristics of the data record individually or relative to other data records. Example meta attributes may include a characteristic of the data record (e.g., approval rate relative to other data records, whether the data record includes one or more flag words, absolute resource transfer value, etc.). Accordingly, the system 100 may be configured to conduct operations generating anomaly detection models to provide an interim anomaly measure corresponding to each meta attributes.

In response to determining a plurality of interim anomaly measures corresponding to a plurality of meta attributes for a data record, the system 100 may be configured to determine an anomaly prediction based on a combination of the plurality of interim anomaly measures associated with respective meta attributes associated with the data record. The anomaly prediction may be based on a composite score by combining the plurality of interim anomaly measures. In scenarios where at least one interim anomaly measure (corresponding to a meta attribute) indicates that the data record may be an anomalous data record, the overall anomaly prediction may indicate that the data record is an anomaly or outlier.

In some embodiments, the combination of the plurality of interim anomaly measures may include a weighted summation of the plurality of interim anomaly measures. The following are example weight factors associated with a list of meta attributes corresponding to data records:

| Meta Attribute | Description | Example Weight Factor |
| --- | --- | --- |
| Score_ABS_CAD_Amount | Canadian dollar value associated with a data record or journal entry | 1 |
| Score_Approver_FlagWords_JP | Data record or journal entry associated with a journal approver that contain flag words | 1 |
| Score_Approver_Reverse_Jp | Data record or journal entry associated with a creator that are auto-reversals | 0.25 |
| Score_journal_approval_rate | Rate that a data record or series of data records were approved | 3 |
| Score_journal_desc_flag_word | Binary score indicating whether or not a data record or journal entry description contains a flag word | 0.5 |

In the examples listed above, the "scorejournal_approval_rate" meta attribute is associated with a weight factor (e.g., "3") greater than the "score_approver_reverse" meta attribute, thereby indicating that the detection model may determine that data records (e.g., manual journal entries) that may be approved relatively quickly pose a larger concern to data integrity than data records that may be corrected following data record creation. The example weight factors illustrated above are for ease of exposition and illustration, and other weight factors associated with meta attributes corresponding to data records may be contemplated.

In some embodiments, the combination of interim anomaly measures may be based on a mathematical combination. In embodiments where the interim anomaly measures are numerical scores, the overall anomaly prediction may be based on a summation of the respective interim anomaly measures. In some embodiments, the overall anomaly prediction may be based on a weighted combination of the respective interim anomaly measures.

In some embodiments, the overall anomaly prediction may be a numerical score, may be a category indicator (e.g., high anomaly, medium anomaly, non-anomaly), or other categorical measure for providing an indication on whether subsequent processing of the data record is warranted.

Figure 6:
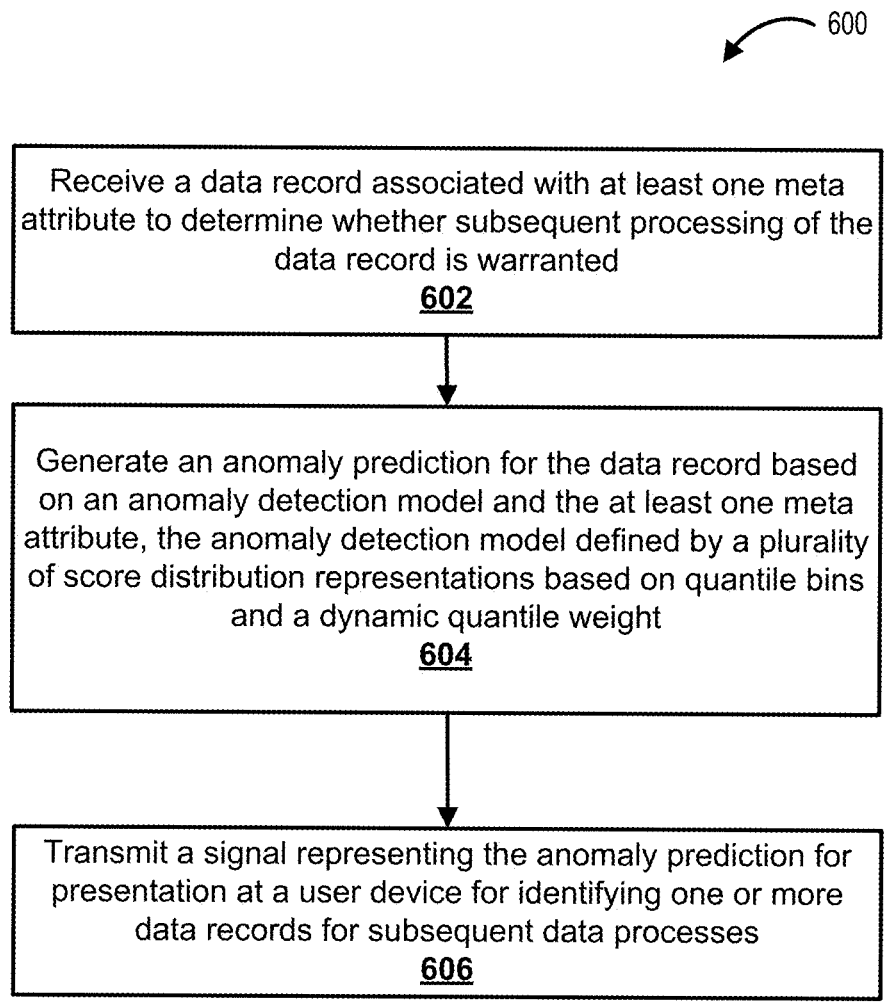
FIG. 6 illustrates a method of monitoring for anomalous data records in a plurality of data records, in accordance with an embodiment of the present disclosure.

Reference is made to FIG. 6, which illustrates a method 600 of monitoring for anomalous data records in a plurality of data records, in accordance with an embodiment of the present disclosure. The method 600 may be conducted by the processor 102 of the system 100 (FIG. 1). Processor-executable instructions may be stored in the memory 106 and may be associated with the anomaly prediction application 112 or other processor-executable applications not explicitly illustrated in FIG. 1. The method 600 may include operations such as data retrievals, data manipulations, data storage, or other operations, and may include computer-executable operations.

For ease of exposition, the method 600 may be described with reference to an example banking institution system configured to monitor for anomalous data records. Data records being monitored may include example manual journal entries described in earlier examples. Manual journal entries may be for tracking resource transfers. In some embodiments, manual journal entries may be for other types of records.

In some embodiments, respective manual journal entries may be associated with meta attributes, which may be representative of characteristics of data records individually or relative to other data records in a dataset. As an example, a meta attribute may represent a rate at which a series of journal entries (including the given journal entry) may have been approved by an approver user. In another example, a meta attribute may represent whether the journal entry includes descriptive text having flag words that may suggest a potential anomalous data record. In another example, a meta attribute may represent whether the given journal entry has been revised or corrected since journal entry creation.

In some scenarios, manual journal entries may need to be approved or otherwise scrutinized by an approver user (associated with a client device) prior to being promoted or advanced to a subsequent resource transfer process. In scenarios where the approver user may not appropriately scrutinize a journal entry, it may be beneficial to provide methods of monitoring for anomalous data records, thereby increasing a chance or confidence that approval of manual journal entries adhere to policies associated with accuracy, completeness, or other factors.

At operation 602, the processor may receive a data record associated with one or more meta attributes to determine whether subsequent processing of the data record may be warranted. For example, the processor may conduct operation 602 subsequent to an approver user (via a client device 130) having approved a data record (e.g., journal entry).

In some embodiments, the data record may be among a plurality of data records of a dataset. In some embodiments, the dataset may be provided as a data matrix, and the data record may be a row of the data matrix.

In some embodiments, the respective data records may be associated with one or more meta attributes, such as whether the journal entry includes defined "flag words" within descriptive text, resource value associated with the journal entry, the rate of approval of the journal entry among a group of other journal entries, among other examples. In some scenarios, the processor may determine, based on associated meta attributes, whether subsequent processing (e.g., data scrutiny) of the data record may be warranted.

In some embodiments, the processor may determine meta attribute values based on a combination of a plurality of data records associated with a prior point in time. For example, the meta attribute value may represent the rate at which a given data record in combination with one or more other data records were approved by an approver user. If the approver user is detected to have approved several data records within 5 seconds, the processor may conduct operations for inferring that the approver user may not have spent sufficient time to read or scrutinize the data record associated with a resource transfer.

At operation 604, the processor may generate an anomaly prediction for the data record based on a detection model and the at least one meta attribute associated with the data record. The detection model may be defined by a plurality of score distribution representations based on quantile bins and a dynamic quantile weight. The anomaly prediction may be based on one or a plurality of meta attributes associated with the data record.

In some embodiments, the plurality of score distribution representations may respectively correspond to a meta attribute associated with the data record. For example, the respective score distribution representations may be for generating a model for identifying one or more categories of anomaly predictions (e.g., high outlier, medium outlier, non-outlier, etc.) based on the specific meta attribute. In some embodiments, the respective score distribution representations may be for generating a model to provide an interim anomaly measure. Thus, a combination of the plurality of interim anomaly measures (e.g., associated with respective meta attributes) may be for generating the anomaly prediction for the data record.

In some embodiments, the combination of the plurality of interim anomaly measures associated with the respective meta attributes may include a weighted combination of the respective interim anomaly measures. The weighted combination may correspond to relative importance of respective meta attributes.

In some embodiments, the dynamic quantile weight may be a threshold factor for configuring a threshold value corresponding to identifying an anomalous data record. The threshold factor (e.g., disclosed with reference to FIG. 5) may be based on a plurality of data records associated with a prior point in time. For example, the threshold factor may be a variable that determines an approximate quantity of data records that the system may identify as an outlier data record based on historical analysis of quantity of outliers.

In some embodiments, the quantile bins may be defined based on quartiles of the respective score distribution representations. In some embodiments, the processor may identify that a data record is anomalous based on a quantile bin defined by a threshold determined using a weighted inter-quartile range value (e.g., disclosed with reference to FIG. 5).

In some scenarios, a generated anomaly prediction may indicate that a data record may be a strong outlier, a mild outlier, or a non-outlier. In some embodiments, the generated anomaly prediction may be a numerical indication of whether the data record may be an anomaly relative to a plurality of data records in a dataset. Other anomaly identification categorizations may be contemplated.

At operation 606, the processor may transmit a signal representing the anomaly prediction for presentation at a user device 130 (FIG. 1). The signal representing the anomaly prediction may be for identifying one or more data records for subsequent data processes. In some embodiments, an anomaly prediction indicating that a data record may be a "high anomaly" may communicate to a client device 130 (FIG. 1) that the data record may require further scrutiny prior to causing effect to a resource transfer associated with the data record.

For example, a data record representing a manual journal entry may have a data attribute indicating that the data record includes "flag words", such as "unusual" or "urgent". In the present example, such data records associated with such flag words that have nonetheless been approved by an approver user may warrant further scrutiny, at least because the approver user may have overlooked the contents of the data record. In some embodiments, the processor may conduct further data process operations for further scrutinizing the data record prior to effecting a resource transfer (e.g., journal entry for a resource transfer).

In some embodiments, the signal representing the anomaly prediction may be for generating a user interface for display at the system 100 or at a client device 130 in communication with the system 100. For example, the processor may generate a graphical user interface based on the signal representing the anomaly prediction for displaying an aggregate anomaly prediction for the plurality of data records.

Figure 7:
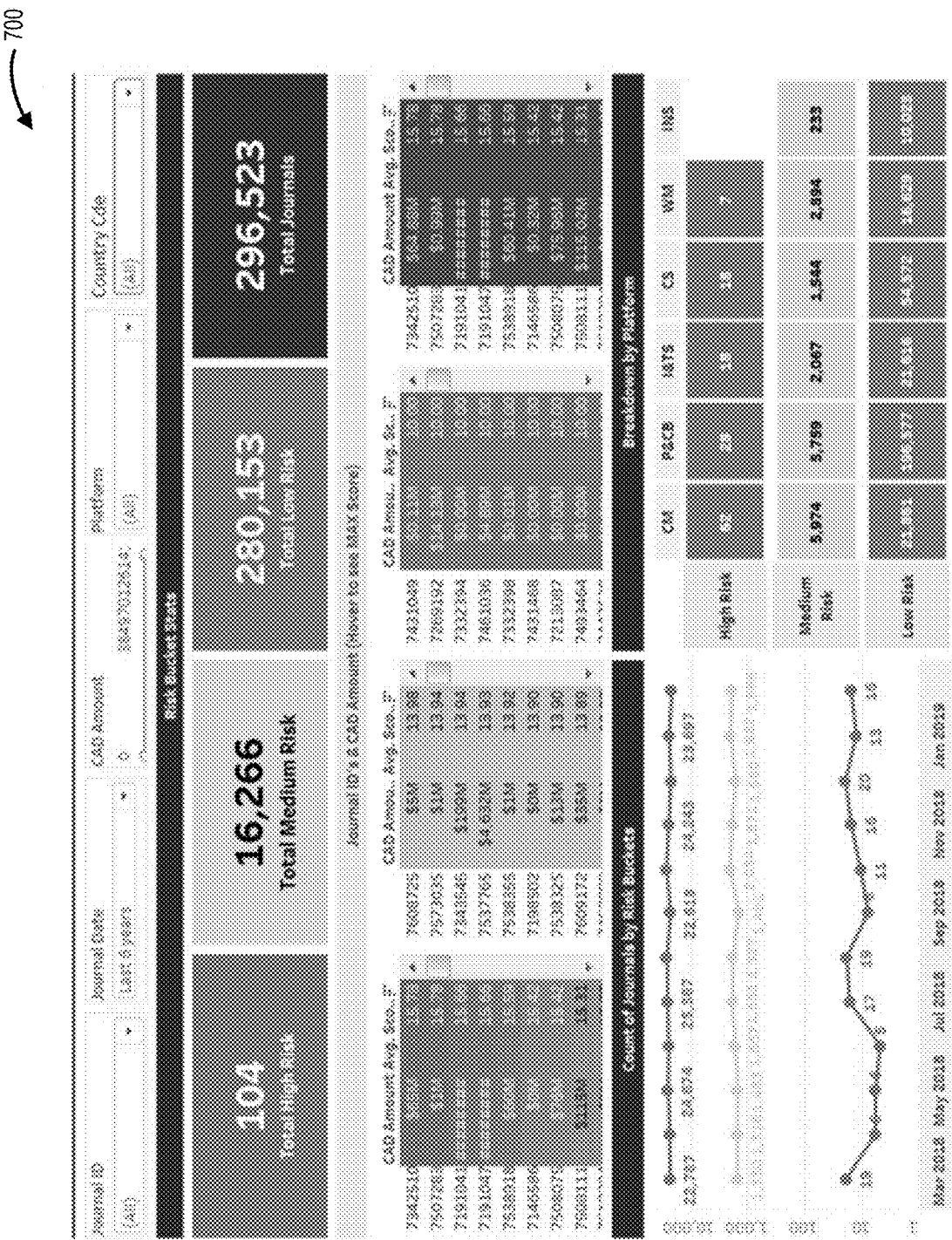
FIG. 7 illustrates a user interface configured to display summary data associated with anomaly predictions, in accordance with embodiments of the present disclosure.

Reference is made to FIG. 7, which illustrates a user interface 700 configured to display summary data, in accordance with embodiments of the present disclosure. In some embodiments, the user interface 700 may be dynamically generated to include or to filter anomaly predictions associated with particular characteristics. For example, the user interface 700 may be based on dates that data records were created, based on resource transfer quantity (e.g., transaction quantity in CAD or US dollars), based on data record identification numbers, or other criteria.

In some embodiments, the user interface 700 may be regenerated on a periodic basis based on subsequently generated outlier criteria associated with subsequent time periods. For example, the user interface 700 may be generated based on evolving data trends, data averages, or changes to status quo metrics. In some embodiments, the user interface 700 may be updated based on revisions to dynamic quantile weights associated with detection models described in the present disclosure.

In some embodiments, the processor may determine that one or a group of data records may be identified as potentially anomalous, and the processor may transmit a message to a client device 130 to request further explanation or rationale from a user for creation or approval of the data records being identified as potentially anomalous.

In some scenarios, the system of monitoring for anomalous data records may, on a recurring basis, identify data records having particular meta attributes as being an anomaly or outlier. For example, the system may, on a recurring basis, identify a plurality of data records approved by a particular user approver (e.g., Jill) as being an anomaly or outlier. These plurality of data records may have been approved during late hours in a day (e.g., at 2 am local time), and the system may be configured to identify such data record approvals as potential anomalies, when in reality the data records may have a valid reason for being routinely approved during late hours in a day. For instance, Jill may be working on a "flexible" arrangement where Jill works on an alternate schedule.

It may be beneficial to provide systems for correcting potential bias, or revising criteria that may be explainable, when monitoring for anomalous data records. Meta attributes associated with time-based identification of outlier data records (e.g., example above) is an example, and other meta attributes for identifying potential detection model bias may be contemplated.

In some embodiments, the processor may determine that a plurality of data records associated with at least one of a particular user or a particular subgroup associated with a meta attribute value are identified as outlier data records for indicating biased identification of data records. The processor may, subsequently, generate one or more updated score distribution representations to minimize identified bias among anomaly predictions.

In scenarios where the system may identify a large percentage of data records as being outliers, the processor may dynamically vary a threshold factor (see example disclosed with reference to FIG. 5). In some other embodiments, the processor may generate updated score distribution representations for providing updated detection models. The updated detection models may reflect altering trends that alter what data records in a dataset population may represent outlier or anomalies.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system of monitoring for anomalous data records in a plurality of data records comprising:
   a processor; and
   a memory coupled to the processor and storing processor-executable instructions that, when executed, configure the processor to:
      receive an electronic approval signal associated with a data record defining a resource transfer data process, the data record associated with at least one meta attribute to determine whether a subsequent electronic approval operation for the data process is warranted, wherein the electronic approval signal triggers promotion of the resource transfer data process to be executed by the processor;
      generate an anomaly prediction for the electronic approval signal based on a detection model and the at least one meta attribute, the detection model defined by a plurality of score distribution representations based on quantile bins and a dynamic quantile weight tunable over time, the detection model generating an interim anomaly measure corresponding to respective score distribution representations, wherein the anomaly prediction is generated based on a combination of interim anomaly measures associated with respective meta attributes;
      generate a subsequent electronic approval operation for the data record based on the anomaly prediction prior to executing, by the processor, the defined resource transfer data process; and
      transmit a signal representing the anomaly prediction for presentation at a user device for identifying one or more data processes for the subsequent electronic approval operation.

2. The system of claim 1, wherein the combination of interim anomaly measures associated with the respective meta attributes includes a weighted combination of the respective interim anomaly measures, wherein the weighted combination corresponds to relative importance of respective meta attributes.

3. The system of claim 1, wherein the dynamic quantile weight includes a threshold factor for configuring a threshold value corresponding to identifying an anomalous electronic approval signal, and wherein the threshold factor is based on a plurality of electronic approval signals associated with a prior point in time.

4. The system of claim 1, wherein the processor is configured to:
   determine that a plurality of electronic approval signals associated with at least one of a particular user identifier or a particular subgroup associated with a meta attribute value are identified as outlier electronic approval signals for indicating biased identification of data processes; and
   generating one or more updated score distribution representations to minimize identified bias among anomaly predictions.

5. The system of claim 1, wherein the processor is configured to determine the meta attribute based on a combination of a plurality of electronic approval signals associated with a user identifier.

6. The system of claim 5, wherein the meta attribute represents a rate of received electronic approval signals associated with the user identifier.

7. The system of claim 4, wherein the processor is configured to determine the meta attribute value based on a combination of a plurality of electronic approval signals associated with a prior point in time.

8. The system of claim 1, wherein the quantile bins are based on quartiles of the respective score distribution representations, and wherein an anomalous electronic approval signal is associated with a quantile bin based on a weighted inter-quartile range value.

9. The system of claim 1, wherein the plurality of score distribution representations are respectively based on a logarithmic transformation of metric distribution representations associated with respective meta attributes.

10. The system of claim 1, wherein the processor is configured to:
    identify a plurality of electronic approval signals; and
    generate a graphical user interface based on the signal representing the anomaly prediction for displaying an aggregate anomaly prediction for the plurality of electronic approval signals associated with respective data records.

11. A method of monitoring for anomalous data records in a plurality of data records comprising:
    receiving an electronic approval signal associated with a data record defining a resource transfer data process, the data record associated with at least one meta attribute to determine whether a subsequent electronic approval operation for the data process is warranted, wherein the electronic approval signal triggers promotion of the resource transfer data process to be executed by the processor;
    generating an anomaly prediction for the electronic approval signal based on a detection model and the at least one meta attribute, the detection model defined by a plurality of score distribution representations based on quantile bins and a dynamic quantile weight tunable over time, the detection model generating an interim anomaly measure corresponding to respective score distribution representations, wherein the anomaly prediction is generated based on a combination of interim anomaly measures associated with respective meta attributes;

generating a subsequent electronic approval operation for the data record based on the anomaly prediction prior to executing, by the processor, the defined resource transfer data process; and transmitting a signal representing the anomaly prediction for presentation at a user device for identifying one or more data processes for the subsequent electronic approval operation.

12. The method of claim 11, wherein the combination of interim anomaly measures associated with the respective meta attributes includes a weighted combination of the respective interim anomaly measures, wherein the weighted combination corresponds to relative importance of respective meta attributes.

13. The method of claim 11, wherein the dynamic quantile weight includes a threshold factor for configuring a threshold value corresponding to identifying an anomalous electronic approval signal, and wherein the threshold factor is based on a plurality of electronic approval signals associated with a prior point in time.

14. The method of claim 11, comprising:
determine that a plurality of electronic approval signals associated with at least one of a particular user identifier or a particular subgroup associated with a meta attribute value are identified as outlier electronic approval signals for indicating biased identification of data processes; and generating one or more updated score distribution representations to minimize identified bias among anomaly predictions.

15. The method of claim 11, comprising: determining the meta attribute based on a combination of a plurality of electronic approval signals associated with a user identifier.

16. The method of claim 15, wherein the meta attribute include& represents a rate of received electronic approval signals associated with the user identifier.

17. The method of claim 14, comprising determining the meta attribute value based on a combination of a plurality of electronic approval signals associated with a prior point in time.

18. The method of claim 11, wherein the quantile bins are based on quartiles of the respective score distribution representations, and wherein an anomalous electronic approval signal is associated with a quantile bin based on a weighted inter-quartile range value.

19. The method of claim 11, wherein the plurality of score distribution representations are respectively based on a logarithmic transformation of metric distribution representations associated with respective meta attributes.

20. A non-transitory computer-readable medium or media having stored thereon machine interpretable instructions which, when executed by a processor, cause the processor to perform a computer-implemented method of monitoring for anomalous data records in a plurality of data records, the method comprising:

receiving an electronic approval signal associated with a data record defining a resource transfer data process, the data record associated with having at least one meta attribute to determine whether a subsequent electronic approval operation for the data process is warranted, wherein the electronic approval signal triggers promotion of the resource transfer data process to be executed by the processor;

generating an anomaly prediction for the electronic approval signal based on a detection model and the at least one meta attribute, the detection model defined by a plurality of score distribution representations based on quantile bins and a dynamic quantile weight tunable over time, the detection model generating an interim anomaly measure corresponding to respective score distribution representations, wherein the anomaly prediction is generated based on a combination of interim anomaly measures associated with respective meta attributes;

generating a subsequent electronic approval operation for the data record based on the anomaly prediction prior to executing, by the processor, the defined resource transfer data process; and transmitting a signal representing the anomaly prediction for presentation at a user device for identifying one or more data processes for the subsequent electronic approval operation.

\* \* \* \* \*